Dec. 24, 1929.  H. B. OETTLE  1,740,743
AUTOMATIC TRAM CAR LOADING GATE
Filed Feb. 9, 1927   3 Sheets-Sheet 2

WITNESS:

INVENTOR
Harry B. Oettle
BY
Augustus B. Stoughton
ATTORNEY.

Dec. 24, 1929.  H. B. OETTLE  1,740,743
AUTOMATIC TRAM CAR LOADING GATE
Filed Feb. 9, 1927   3 Sheets-Sheet 3

WITNESS:
Robt R Kitchel.

INVENTOR
Harry B. Oettle
BY
Augustus B. Stoughton
ATTORNEY.

Patented Dec. 24, 1929

1,740,743

UNITED STATES PATENT OFFICE

HARRY B. OETTLE, OF PHILADELPHIA, PENNSYLVANIA, ASSIGNOR TO R. H. BEAUMONT CO., OF PHILADELPHIA, PENNSYLVANIA, A CORPORATION OF PENNSYLVANIA

AUTOMATIC TRAM-CAR LOADING GATE

Application filed February 9, 1927. Serial No. 166,939.

The principal objects of the present invention are to provide for automatically and entirely filling a traversing car even though the car may be comparatively long, and to provide hopper gate means operated by the traverse of a car in such a way that a car, either comparatively short or long, can be filled from an ample supply of hopper material without spilling the latter and at the end of its traverse.

Other objects of the invention will appear from the following description at the end of which the invention will be claimed and the description will be made with reference to the accompanying drawings forming part hereof and in which Figure 1 is an elevational view of a traversing tram car, a loading hopper, and automatic loading means embodying features of the invention.

Figure 1:
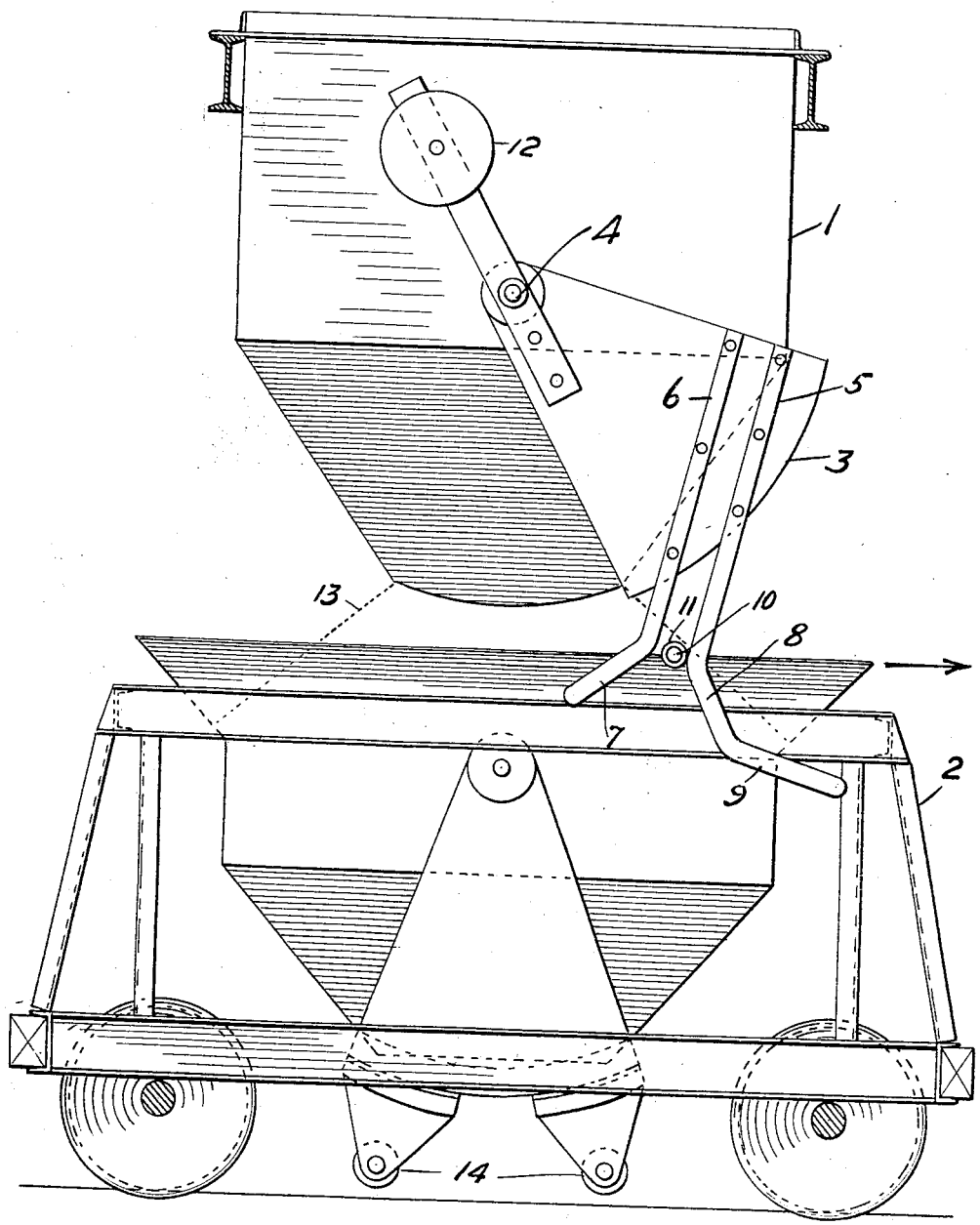
Figure 2:
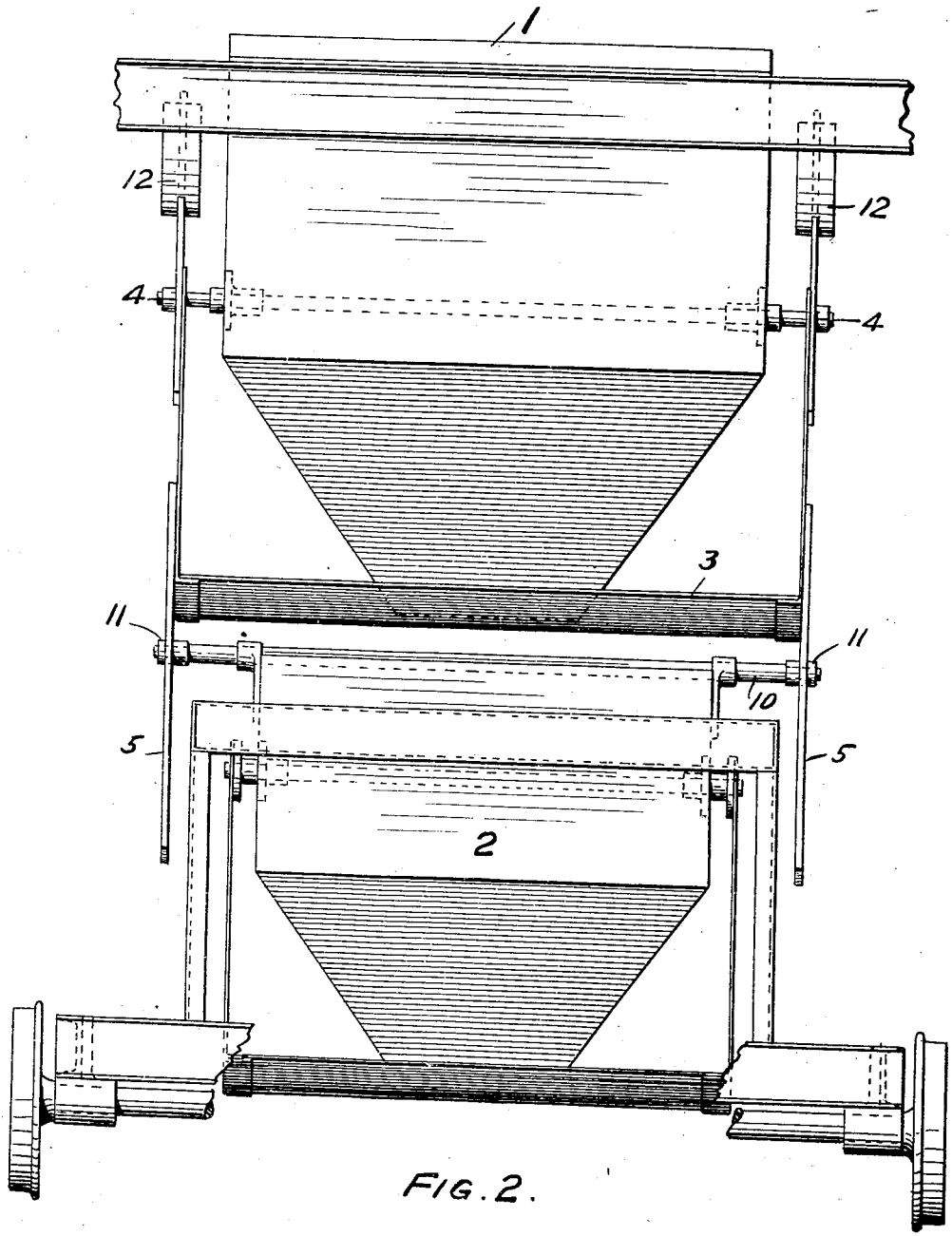
Fig. 2 is an end view of Fig. 1 with a portion of the car broken away.

In the drawings 1 is a hopper and 2 is a tram car which is traversed from the left in Fig. 1 to a position generally under the hopper 1 where it is loaded and then returned toward the left where it is dumped to be again brought under the hopper and there filled. 3 is the gate of the hopper and it is pivoted at 4. According to the present invention the gate 3 is opened and closed by the car, so that the car is filled from the hopper automatically. As shown in the drawings there are duplicate means arranged on opposite sides of the gate and car and a description of one of these means will suffice. 5 and 6 are guides or rails having the portions thereof adjacent the end wall of the gate, to which they are shown as secured, disposed in parallelism and arranged to intercept the arc described by the pivotal gate and said rails or guides extend in parallelism beyond the gate and then in divergent relation as at 7 and 8, and one of said rails or guides 5 is further extended in increasingly divergent relation as at 9. 10 is a bar shown as extending clear across the car and connected therewith, and the ends of the bar 10, or more accurately rollers 11, provided upon them are arranged for cooperation with the rails or guides.

Figure 3:
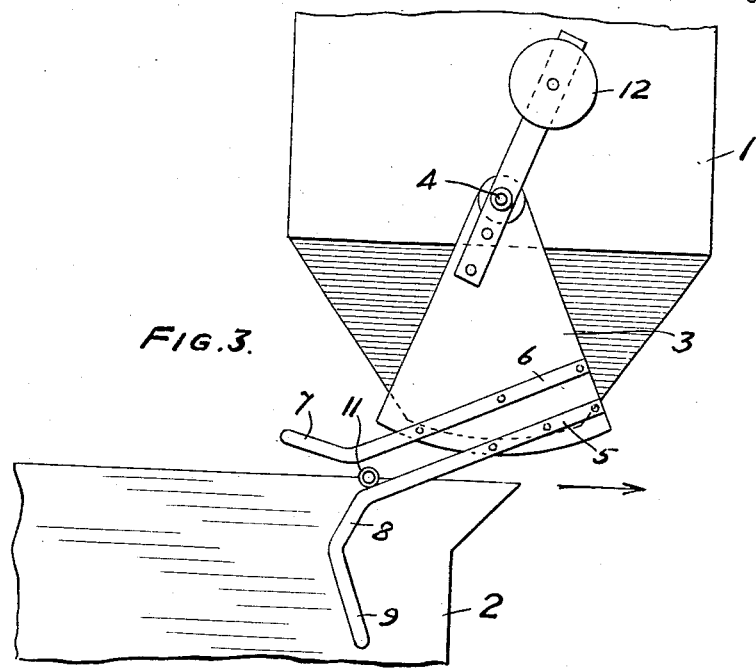
Figs. 3 and 4 are side views of parts of the apparatus shown in the other figures and illustrative of the operation.
Figure 4:
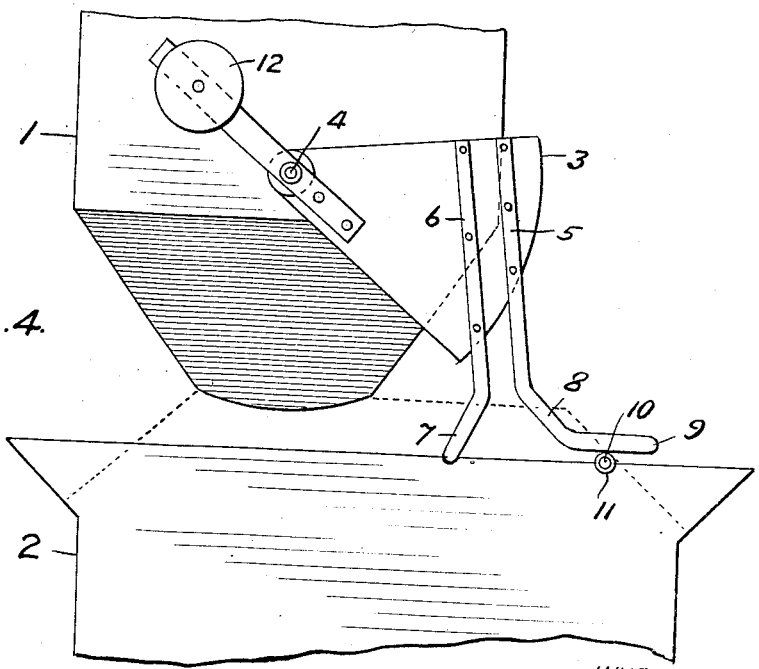

The mode of operation of the described structure may be explained as follows:

Normally the gate 3 is in closed position, as shown in Fig. 3, and the counterweights 12, when present, balance the weight of the rails 5 and 6. As a tram car 2 is moving from left to right in the drawings it approaches and starts to run in under the hopper 1, and the roller 11 operating upon the rail or guide 5, as indicated in Figure 3, turns the gate to open position, as indicated in Fig. 4, delivering material from the hopper to the car. The extension 9, when present, riding upon the roller 11, operates to hold the gate in open position whilst the car may travel to the right to the point at which its direction of travel is reversed so that the car, even though comparatively long, can be filled throughout its length. It may be remarked that the area of the opening in the hopper is smaller than the area of the open top of the car so that the material in the car reaching its angle of rest, as indicated by the dotted lines 13 in Fig. 1, prevents further discharge from the hopper even though the latter be comparatively full. Upon the return travel toward the left of the filled car, the rail or guide 6 is operated upon by the roller 11 to close the gate and in closing, the gate cuts through the pile of material that extends from the hopper to the car. If the gate is heavy enough to closed by its own weight the rail or guide 6 is not in all cases necessary.

It will be observed that when the parts are in the position shown in Fig. 4, the end of the rail or guide 6 projects nearer to the ground than the face of the part 9 of the rail or guide 5, and the purpose of this is to insure that when the roller 11 is traveling toward the left it will engage the end of the guide or rail 6 in order to shut the gate and cause it to cut through the material supported by the car.

At 14 are indicated means which are availed of for emptying or dumping the car at any point in its travel to the left of the hopper.

It will be obvious to those skilled in the art to which the invention relates that modifications may be made in details of construction and arrangement and in matters of mere form without departing from the spirit of the invention which is not limited to such matters or otherwise than the prior art and the appended claim may require.

I claim:

In apparatus of the type recited a hopper having the area of its discharge opening smaller than the area of the open top of the car to choke discharge from the hopper into the car, a traversing tram car adapted to run under and past the opening before its direction of travel is reversed, a single gate movable in the arc of a circle and having an edge arranged to cut through the choked material and to cover and uncover the hopper opening, a roller mounted on the car and arranged outside thereof, and a pair of rails carried by the gate and arranged in parallelism and disposed to intercept at an acute angle the arc described by the gate and the ends of said rails arranged in diverse relation and the end of one of said rails disposed in angular relation to the adjacent part thereof.

HARRY B. OETTLE.